(12) United States Patent
Won et al.

(10) Patent No.: US 11,550,915 B2
(45) Date of Patent: Jan. 10, 2023

(54) METHOD AND SYSTEM FOR DATA SECURITY AND APPARATUS FOR EXECUTING THE SAME

(71) Applicant: SAMSUNG SDS CO., LTD., Seoul (KR)

(72) Inventors: Young Sun Won, Seoul (KR); Bin Na Lee, Seoul (KR); Hyung Tak Oh, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 336 days.

(21) Appl. No.: 16/883,022

(22) Filed: May 26, 2020

(65) Prior Publication Data
US 2020/0380132 A1 Dec. 3, 2020

(30) Foreign Application Priority Data
May 28, 2019 (KR) .................... 10-2019-0062486

(51) Int. Cl.
*G06F 21/56* (2013.01)
(52) U.S. Cl.
CPC ...... *G06F 21/566* (2013.01); *G06F 2221/034* (2013.01)
(58) Field of Classification Search
CPC .................................................. G06F 21/566
See application file for complete search history.

(56) References Cited

U.S. PATENT DOCUMENTS

| 10,320,813 B1* | 6/2019 | Ahmed | H04L 63/1416 |
| 2014/0146961 A1* | 5/2014 | Ristock | H04M 3/5234 |
| | | | 379/265.11 |
| 2020/0259857 A1* | 8/2020 | Tora | G06F 16/2458 |

FOREIGN PATENT DOCUMENTS

| CN | 106599686 A | * | 4/2017 | ............ G06F 21/56 |
| CN | 107528818 A | * | 12/2017 | ........... G06F 16/958 |
| KR | 10-2015-0027567 A | | 3/2015 | |

* cited by examiner

*Primary Examiner* — Matthew Smithers
*Assistant Examiner* — Shu Chun Gao
(74) *Attorney, Agent, or Firm* — The PL Law Group, PLLC (57) ABSTRACT

A computing device according to an embodiment includes one or more processors, a memory in which one or more programs to be executed by the one or more processors are stored, a queue manager configured to receive a security detection request including a detection target file, a plurality of detectors configured to perform a security detection operation on the target detection file, and an operation distributor configured to acquire detection policy information related to the detection target file and distribute the detection target file received from the queue manager to one or more of the plurality of detectors based on the detection policy information.

16 Claims, 4 Drawing Sheets

METHOD AND SYSTEM FOR DATA SECURITY AND APPARATUS FOR EXECUTING THE SAME

CROSS-REFERENCE TO RELATED APPLICATION

This application claims the benefit under 35 USC § 119(a) of Korean Patent Application No. 10-2019-0062486, filed on May 28, 2019, in the Korean Intellectual Property Office, the entire disclosure of which is incorporated herein by reference for all purposes.

BACKGROUND

1. Field

Disclosed embodiments relate to data security technology.

2. Discussion of the Related Art

Various documents, materials, or contents created by companies or institutions may contain content that conflicts with laws and regulations or security policies within the companies in relation to various stakeholders, such as various internal and external companies, public institutions, partner firms, and consumers. Therefore, it is necessary to detect whether files and the like created in a company contain any content that conflict with the laws and regulations or security policies of the company. Here, the existing detection method has a piecemeal detection policy of an operator, and provides primary post-processing (e.g., inquiring a target list, sending a mail to the head of a relevant department or to an information security department, or the like) for detection results on a per-user basis, which has limitation in protecting assets and information in the enterprise.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Disclosed embodiments are intended to provide a new technique related to data security detection.

In an embodiment, there is provided a computing device including one or more processors, a non-transitory memory in which one or more programs to be executed by the one or more processors are stored, a queue manager configured to receive a security detection request including a detection target file, a plurality of detectors configured to perform a security detection operation on the target detection file, and an operation distributor configured to acquire detection policy information related to the detection target file and distribute the detection target file received from the queue manager to one or more of the plurality of detectors based on the detection policy information.

The queue manager may include a waiting queue configured to sequentially store the received security detection request and an input queue configured to sequentially receive the detection target file included in the security detection request from the waiting queue and to sequentially deliver the received detection target file to the operation distributor.

The operation distributor may receive detection result information from the detectors to which the detection target file is distributed and the queue manager may further include an output queue configured to receive the detection result information from the operation distributor and to sequentially output the detection result information.

The detection policy information may include one or more rules having one or more application areas for security detection of the detection target file and the operation distributor may distribute, according to the one or more application areas of the one or more rules in the detection policy information, the detection target file to the one or more of the plurality of detectors so that the one or more of the plurality of detectors perform the security detection operation or the one or more application areas, respectively.

The plurality of detectors may be provided to operate in parallel when performing the security detection operation, through the distribution of the operation distributor.

The computing device may further include a detector manager configured to monitor resource status and operation status of the one or more detectors that perform the security detection operation according to the distribution of the operation distributor and to reduce or increase the number of corresponding detectors according to the monitoring result.

The computing device may further include a detector manager configured to change a processor of one or more of the plurality of detectors, delete one or more detectors from the plurality of detectors, or add a new detector to the plurality of detectors according to a change in the detection policy information.

In another embodiment, there is provided a method for data security, which is performed by a computing device comprising one or more processors and a non-transitory memory in which one or more programs to be executed by the one or more processors are stored, the method including receiving, at a queue manager, a security detection request including a detection target file, acquiring, at an operation distributor, detection policy information related to the detection target file and distributing the detection target file received from the queue manager to one or more of the plurality of detectors based on the detection policy information, and performing, at a plurality of detectors, a security detection operation on the target detection file.

The method may further include storing, at the queue manager, sequentially the received security detection request in a waiting queue, inputting, at the queue manager, sequentially the detection target file included in the security detection request in the waiting queue into an input queue, and delivering, at the queue manager, sequentially the detection target file in the input queue to the operation distributor.

The method may further include receiving, at the operation distributor, detection result information from the detectors to which the detection target file is distributed and storing, at the queue manager, the detection result information received from the operation distributor in an output queue and outputting, at the output queue, sequentially the detection result information.

The detection policy information may include one or more rules having one or more application areas for security detection of the detection target file and the distributing may include distributing, at the operation distributor, according to the one or more application areas of the one or more rules in the detection policy information, the detection target file to the one or more of the plurality of detectors so that the one or more of the plurality of detectors perform the security detection operation for the one or more application areas, respectively.

In the performing of the security detection operation, the plurality of detectors may operate in parallel when performing the security detection operation, through the distribution of the operation distributor.

The method may further include monitoring, at a detector manager, resource status and operation status of the detector that performs the security detection operation according to the distribution of the operation distributor and reducing or increasing the number of corresponding detectors according to the monitoring result.

The method may further include changing, at the detector manager, a processor of one or more of the plurality of detectors, deleting one or more detectors from the plurality of detectors, or adding a new detector to the plurality of detectors according to a change in the detection policy information.

In still another embodiment, there is provided a system for data security including a security-related detection device configured to perform a security detection operation on a detection target file and an enterprise business system comprising a file manager configured to transmit the security detection request including the detection target file to the security-related detection device and to receive detection result information from the security-related detection device, a detection policy manager configured to manage the detection policy information related to the detection target file, and a post-processor configured to perform post-processing on the detection target file according to the detection result information, wherein the security-related detection device comprises a queue manager configured to receive a security detection request including the detection target file, a plurality of detectors configured to perform a security detection operation on the target detection file, and an operation distributor configured to acquire detection policy information related to the detection target file and distribute the detection target file received from the queue manager to one or more of the plurality of detectors based on the detection policy information.

When a result of checking the detection result information indicates that an error is included in the security detection operation, the file manager may transmit a request for reprocessing a corresponding detection target file to the security-related detection device.

The detection policy information may include one or more rules for security detection of the detection target file and the operation distributor may distribute, according to an application area of a rule in the detection policy information, the detection target file to a detector that performs security detection according to a corresponding rule.

In yet another embodiment, there is provided a computing device including one or more processors, a non-transitory memory, and one or more programs, wherein the one or more programs are stored in the memory and configured to be executed by the one or more processors and the one or more programs comprising instructions for receiving a security detection request including a detection target file, acquiring detection policy information related to the detection target file, distributing the received detection target file to a plurality of detectors based on the detection policy information, and causing the plurality of detectors to perform a security detection operation on the distributed detection target file.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF EXEMPLARY EMBODIMENTS

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

In the following description, the terminology of "communication", "transmission", "reception" of a signal or information and terminology similar thereto may include a meaning in which a signal or information is directly transmitted from one element to another element and is transmitted from one element to another element through an intervening element. Particularly, a meaning in which a signal or information is "transmitted" or "sent" to another element may indicate a final destination of the signal or information and may not mean a direct destination. This may be equally applied with respect to a meaning of "reception" of the signal or information. Further, in this specification, a meaning in which two or more pieces of data or information are related, it may mean that at least a portion of another data (or information) may be obtained based on one data when one data (or information) is obtained.

Further, it will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

Figure 1:
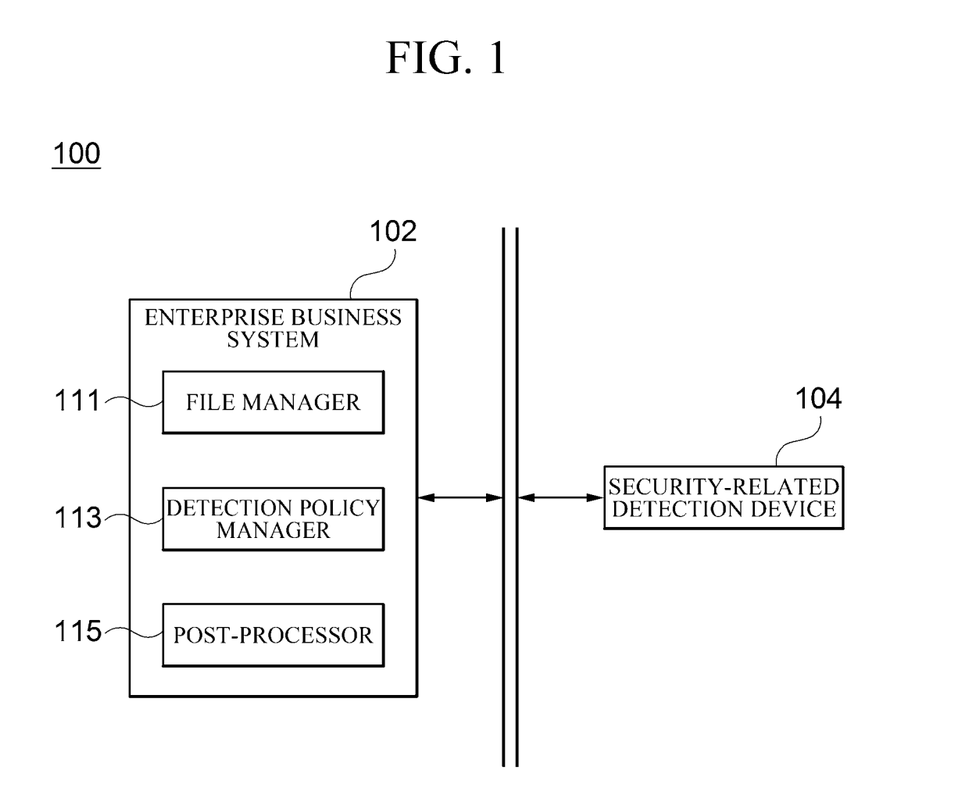
FIG. 1 is a diagram illustrating a configuration of a system for data security according to an embodiment of the present disclosure.

FIG. 1 is a diagram illustrating a configuration of a system for data security according to an embodiment of the present disclosure.

Referring to FIG. 1, the system 100 for data security may include an enterprise business system 102 and a security-related detection device 104. Here, the security-related detection device 104 may be implemented independently of the enterprise business system 102. That is, the security-related detection device 104 may be constructed separately from the enterprise business system 102 without being dependent thereon. In an exemplary embodiment, the system 100 for data security may be applied to compliance detection, but is not limited thereto.

The enterprise business system 102 and the security-related detection device 104 are connected through a communication network to communicate with each other. In some embodiments, the communication network may include the Internet, one or more local area networks, wide area networks, cellular networks, mobile networks, other types of networks, or combinations of these networks.

The enterprise business system 102 is a system that generates a document or a file that is subject to security detection. For example, the enterprise business system 102 may include one or more of a business process management (BPM) system, an electronic document management system (EDMS), an enterprise resource planning (ERP) system, an email system, a file management service system, a messenger service system, and a groupware.

The enterprise business system 102 may include a file manager 111, a detection policy manager 113, and a post-processor 115. In one embodiment, the file manager 111, the detection policy manager 113, and the post-processor 115 may be implemented using one or more physically separated devices, or one or more processors or a combination of one or more processors and software, and may not be clearly distinguished in a specific operation, unlike the illustrated example.

The file manager 111 may store files uploaded from various user terminals (not shown) accessing the enterprise business system 102. Here, the files may include files in various formats (e.g., ppt, xls, doc, xml, msg, pdf, and the like) according to the program used to create the files.

The file manager 111 may transmit a request for security detection on the uploaded file to the security-related detection device 104. The request for security detection is a request to detect whether the uploaded file contains content that conflicts with laws and/or regulations and whether the file contains content that violates security policies set by a corresponding company. The request for security detection may include a detection target file.

In this case, the file manager 111 may extract text from the uploaded file using a text filter or the like. The file manager 111 may generate a detection target file including the extracted text and include the detection target file in the request for security detection. In an exemplary embodiment, the file manager 111 may generate a plain text file with the extracted text and include the generated plain text file in the request for security detection.

Also, the file manager 111 may request and receive detection policy information related to the detection target file from the detection policy manager 113 in response to a request from the security-related detection device 104. The file manager 111 may transmit the received detection policy information to the security-related detection device 104.

The file manager 111 may receive detection result information from the security-related detection device 104. The file manager 111 may check the detection result information and, when an error is included in the detection process, may transmit a request for reprocessing the corresponding detection target file to the security-related detection device 104. The file manager 111 may check the detection result information and, when an error is not included in the detection process, may forward the detection result information to the post-processor 115.

The detection policy manager 113 may manage detection policies for security detection on various documents or files generated in the enterprise business system 102. The detection policy may be a rule that sets a regular expression of a specific keyword or a specific pattern that is expected to be included in various documents or files generated in the enterprise business system 102. A plurality of rules may be set according to properties of a detection target file, author information of a detection target file, or the like. That is, the detection policy may include a rule-set consisting of a plurality of rules. Table 1 shows detection policies according to an embodiment.

TABLE 1

| Rule | Application area | Email address | Post | Department | Keyword |
| --- | --- | --- | --- | --- | --- |
| R1 | User | A@mail.com | | Management team | Keyword A |
| R2 | User | B@mail.com | | Engineering team | Keyword B |
| R3 | IP band | | | | 10.2.30.XX |
| R4 | Resident registration No. | | | | XXXXXX-XXXXXXX |
| R5 | Passport No. | | | | 000-00-000-0000 |
| R6 | Post | | Director | | Keyword E |
| R7 | Post | | Executive Director | | Keyword G |

The detection policy manager 113 may store a detection policy generated by an administrator in a database (not shown). In addition, the detection policy manager 113 may manage an update of a detection policy, such as deletion, addition, or the like, according to an instruction of the administrator. The detection policy manager 113 may forward the detection policy information to the file manager 111 upon request from the file manager 111.

The post-processor 115 may perform post-processing on a corresponding detection target file according to the detection result information. For example, post-processing may include logging of a detection target file, moving and archiving of a detection target file, deletion of a detection target file, restriction of sharing of a detection target file, alert mailing (e.g., a department head, a security department, or the like), providing of a list inquiry, and the like.

The security-related detection device 104 may perform security detection on the detection target file according to the security detection request received from the file manager 111. When performing security detection, the security-related detection device 104 may request and receive detection policy information related to a detection target file from the file manager 111 (or detection policy manager 113), and perform security detection on the corresponding detection target file based on the detection policy information.

Meanwhile, the security-related detection device 104 is described herein as requesting and receiving the detection policy information from the file manager 111, but is not limited thereto, and the file manager 111 may include the detection policy information in a request for security detection when the request for security detection is made.

Figure 2:
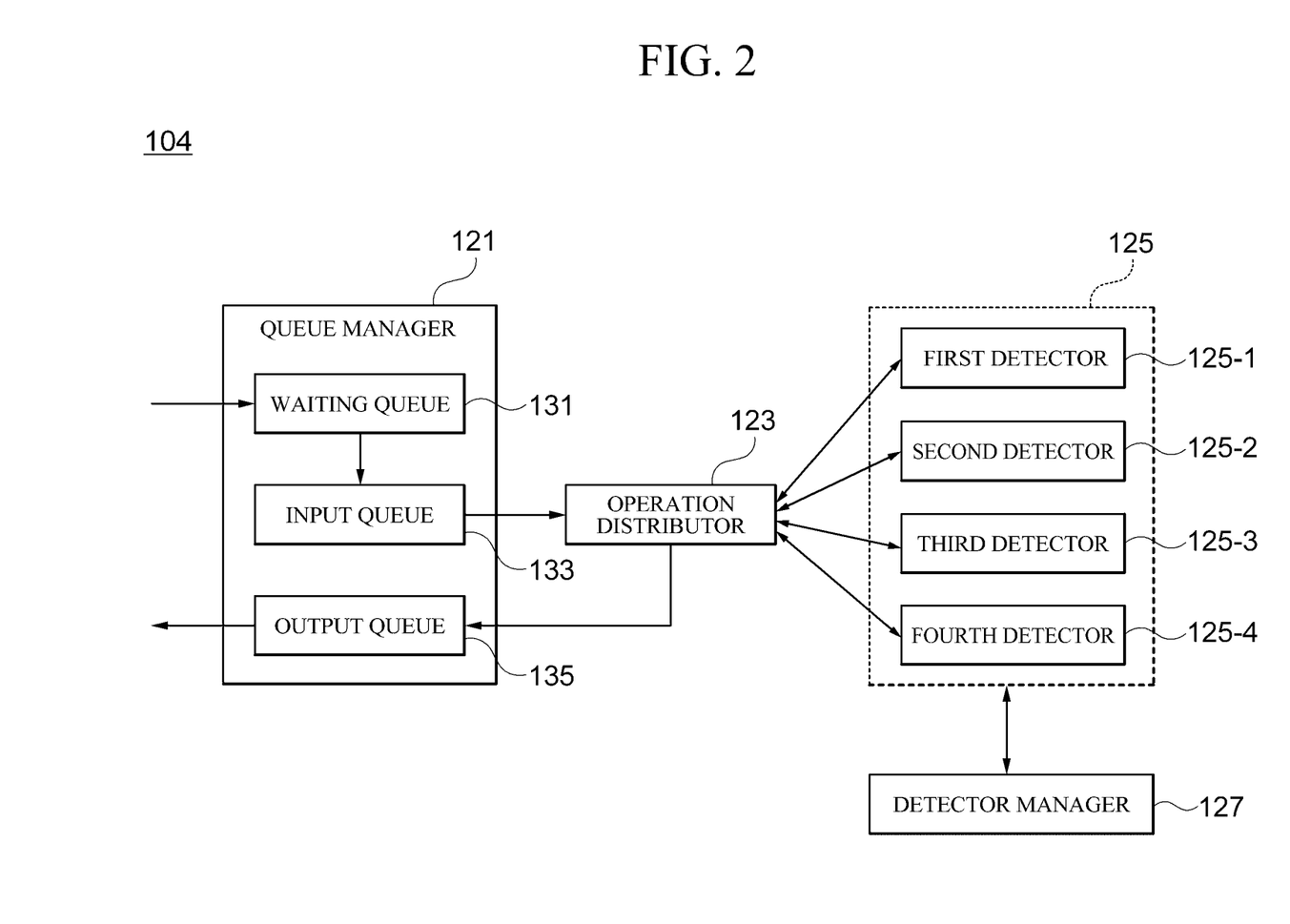
FIG. 2 is a block diagram illustrating a configuration of a security-related detection device according to an embodiment of the present disclosure.

FIG. 2 is a block diagram illustrating a configuration of a security-related detection device 104 according to an embodiment of the present disclosure. Referring to FIG. 2, the security-related detection device 104 may include a queue manager 121, an operation distributor 123, detectors 125, and a detector manager 127.

The queue manager 121 may receive a request for security detection from an enterprise business system 102 and allow the received request for security detection to be sequentially processed by the detector 125. The queue manager 121 may include a waiting queue 131, an input queue 133, and an output queue 135.

The waiting queue 131 may sequentially store the request for security detection received from a file manager 111. The request for security detection includes detection target files. Accordingly, the detection target files may be sequentially registered and stored in the waiting queue 131.

The input queue 133 may sequentially receive the detection target files from the waiting queue 131. The input queue 133 may deliver the input detection target files to the operation distributor 123. That is, the detection target files may be delivered to the operation distributor 123 through the input queue in the order of waiting queue.

The output queue 135 may receive detection result information from the operation distributor 123. The output queue 135 may sequentially transmit the received detection result information to the file manager 111.

When receiving a detection target file from the input queue 123, the operation distributor 123 may acquire detection policy information related to the detection target file. In an exemplary embodiment, the operation distributor 123 may request and receive detection policy information related to the detection target file from the file manager 111.

Based on the detection policy information, the operation distributor 123 may deliver the detection target file to one or more detectors 125 to perform security detection. According to a rule's application area (e.g., user, IP band, resident registration number, passport number, post, department, or the like) in the detection policy information, the operation distributor 123 may deliver the detection target file to the detector 125 that performs detection according to the corresponding rule. That is, the operation distributor 123 may distribute the detection target file to one or more detector 125 to perform a security detection operation according to the rule's application area in the detection policy information. The operation distributor 123 may deliver the detection target file and the detection policy information to each detector 125 to perform a security detection operation.

The operation distributor 123 may receive detection result information from the detector 125 that has performed the security detection operation. The operation distributor 123 may transmit the received detection result information to the output queue 135. In this case, even when an error in the process of detection is included in the detection result information, the detection result information may be transmitted to the output queue 135.

The detectors 125 may perform a security detection operation on the detection target file according to a rule included in the detection policy information. In an exemplary embodiment, the detectors 125 may include a first detector 125-1, a second detector 125-2, a third detector 125-3, and a fourth detector 125-4.

Here, the detectors 125 are described as including the first detector 125-1 to the fourth detector 125-4, but is not limited thereto. The number of detectors may vary depending on the application area of the rule in the detection policy, the type of a detection target file, and the like.

The first detector 125-1 may be a module provided to perform a security detection operation for the application area "user" of the rule in the detection policy information. Referring to Table 1, the first detector 125-1 may perform a security detection operation for rule 1 R1 and rule 2 R2 based on a corresponding detection policy (e.g., whether an email that transmits a detection target file contains keyword A and keyword B, or the like).

The second detector 125-2 may be a module provided to perform a security detection operation for the application area "IP band" of the rule in the detection policy information. Referring to Table 1, the second detector 125-2 may perform a security detection operation for rule 3 R3 based on a corresponding detection policy (e.g., whether the detection target file is registered in the 10.2.30.XX, or the like).

The third detector 125-3 may be a module provided to perform a security detection operation on the application areas "resident registration number and passport number" of the rule in the detection policy information. Referring to Table 1, the third detector 125-3 may perform a security detection operation for rule 4 R4 and rule 5 R5 based on a corresponding detection policy (e.g., whether the detection target file contains a character string with a specific pattern, such as resident registration number and passport number, or the like).

The fourth detector 125-4 may be a module provided to perform a security detection operation for the application area "post" of the rule in the detection policy information. Referring to Table 1, the fourth detector 125-4 may perform a security detection operation for rule 6 R6 and rule 7 R7 based on a corresponding detection policy (e.g., whether the detection target file contains a specific position title (director, executive director) and specific keywords (keyword E and keyword G), or the like).

Here, the first detector 125-1 to the fourth detector 125-4 may perform a security detection operation in parallel on the detection target file. That is, security detection is performed in parallel for the application areas of the rule that are each dealt with by each of the first detector 125-1 to the fourth detector 125-4, so that security detection operation speed can be increased. In addition, the first detector 125-1 to the fourth detector 125-4 may be provided to independently perform a security detection operation on the detection target file.

Meanwhile, although it is described in the present embodiment that one detector performs a security detection operation for one application area of a rule, but the present disclosure is not limited thereto, and one detector may perform a security detection operation for multiple application areas of the rule in a complex manner. For example, referring to Table 1, one detector may perform a security detection operation for application areas "user" and "post" of the rule.

The detector manager 127 may serve to manage the detectors 125. In an exemplary embodiment, when the detection policy information has changed (e.g., a rule is added or deleted), the detector manager 127 may change the existing process of the detector 125 or add a new detector 125 according to the change.

Also, the detector manager 127 may monitor the resource status and operation status of each detector 125. For example, when the resource status of the first detector 125-1 is less than a preset threshold value and the operation status of the first detector 125-1 indicates that the remaining amount of operation is greater than or equal to a preset threshold value, the detector manager 127 may additionally generate a first detector 125-1 for performing a security detection operation for the application area "user" of the rule. In other words, the detector manager 127 may reduce or increase the number of detectors 125 according to the resource status and operation status of the detector 125.

According to an embodiment, since the request for security detection is processed based on a queue in the security-related detection device 104, it is possible to ensure a precedence relationship for the request for security detection. Therefore, it is possible to secure consistency by ensuring the order when a request for large-scale security detection occurs. In addition, even when an error occurs in the process of security detection, a request for reprocessing may be available through an activated queue so that the omission rate can be reduced, thereby increasing reliability.

Moreover, the security-related detection device 104 performs a security detection operation through a plurality of detectors 125, thereby enabling parallel processing for individual detection items, which can improve security detection processing speed, flexibly respond according to the change of detection policies, and allow resources in the security-related detection device 104 to be efficiently utilized.

Also, since the security-related detection device 104 is implemented independently of the enterprise business system 102, the security-related detection device 104 can perform security detection operations on various heterogeneous service systems (e.g., a file management service system, a messenger service system, an email system, and the like) in the enterprise, can be connected to other enterprise business systems, and is easy to expand.

In the specification, the term "module" may indicate a functional and structural combination of hardware for performing the technical idea of the present disclosure and software for operating the hardware. For example, the module can indicate a logical unit that includes a set of codes and a hardware resource which execute the codes, and does not necessarily mean codes that are physically connected or one type of hardware.

Figure 3:
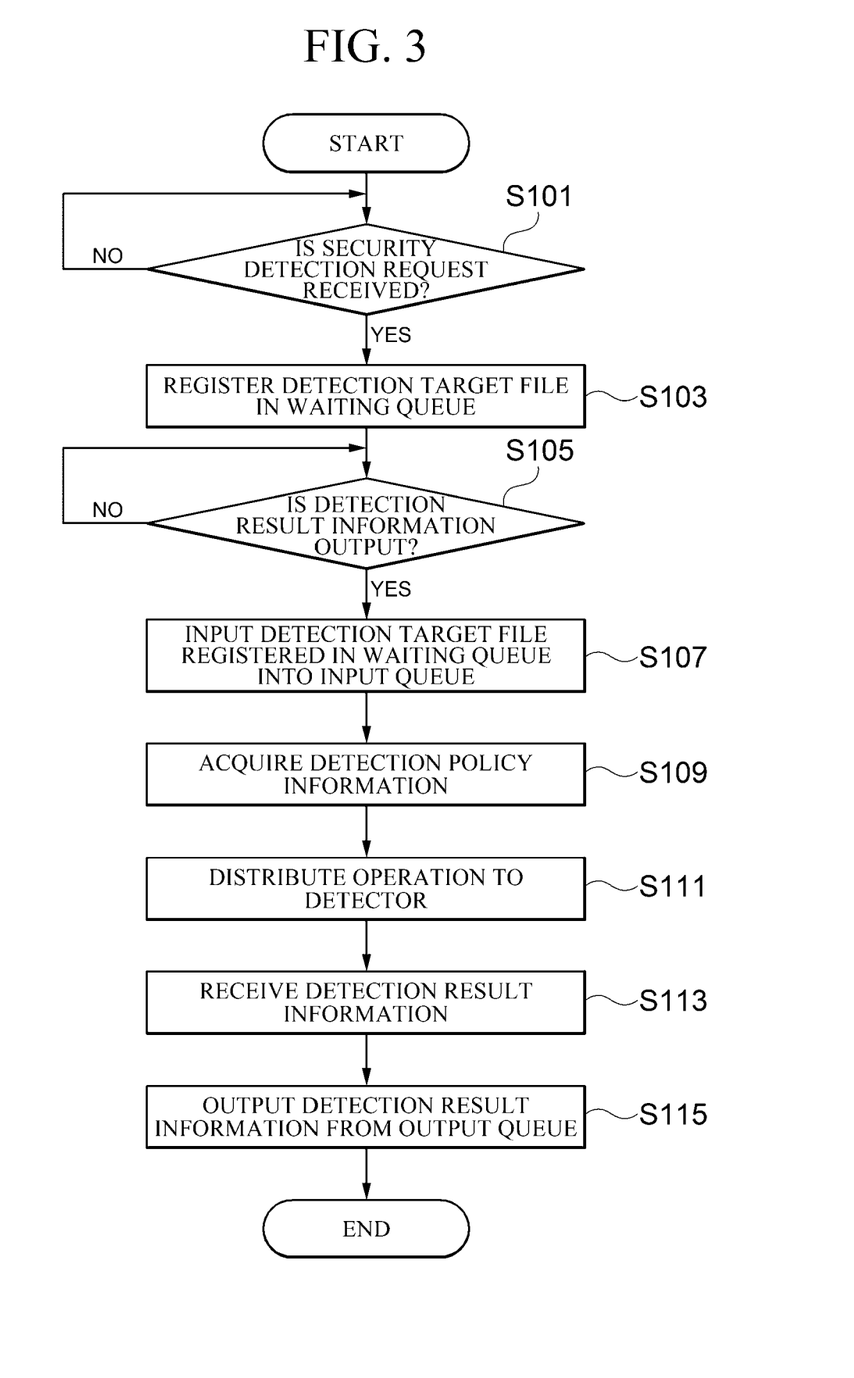
FIG. 3 is a flowchart illustrating a method for data security according to an embodiment of the present disclosure.

FIG. 3 is a flowchart illustrating a method for data security according to an embodiment of the present disclosure. In the illustrated flowchart, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Referring to FIG. 3, a queue manager 121 checks whether a request for security detection is received from an enterprise business system 102 (S101). The request for security detection includes detection target files.

When it is checked in operation S101 that the request for security detection is received, the queue manager 121 registers the detection target files, which are included in the request for security detection, in a waiting queue 131 (S103). The detection target files may be sequentially registered in the waiting queue 131.

Then, the queue manager 121 checks whether or not detection result information is output from an output queue 135 to the enterprise business system 102 for a previously registered detection target file (S105). That is, the queue manager 121 may confirm whether or not a security detection operation is completed for the previously registered detection target files.

When it is checked in operation S105 that the detection result information is output to the enterprise business system 102, the queue manager 121 sequentially inputs the detection target files registered in the waiting queue 131 into an input queue 133 (S107). Then, the input queue 133 sequentially delivers the detection target files to an operation distributor 123.

Then, the operation distributor 123 acquires detection policy information related to the detection target file delivered from the input queue 123 (S109). For example, the operation distributor 123 may request and receive detection policy information related to the corresponding detection target file from the enterprise business system 102.

Then, the operation distributor 123 distributes the detection target file to one or more detectors 125 to perform a security detection operation according to an application area of a rule in the detection policy information (S111).

Thereafter, the operation distributor 123 receives detection result information from the detectors 125 and delivers the same to the output queue 135 (S113). Then, the output queue 135 transmits the detection result information to the enterprise business system 102 (S115).

Figure 4:
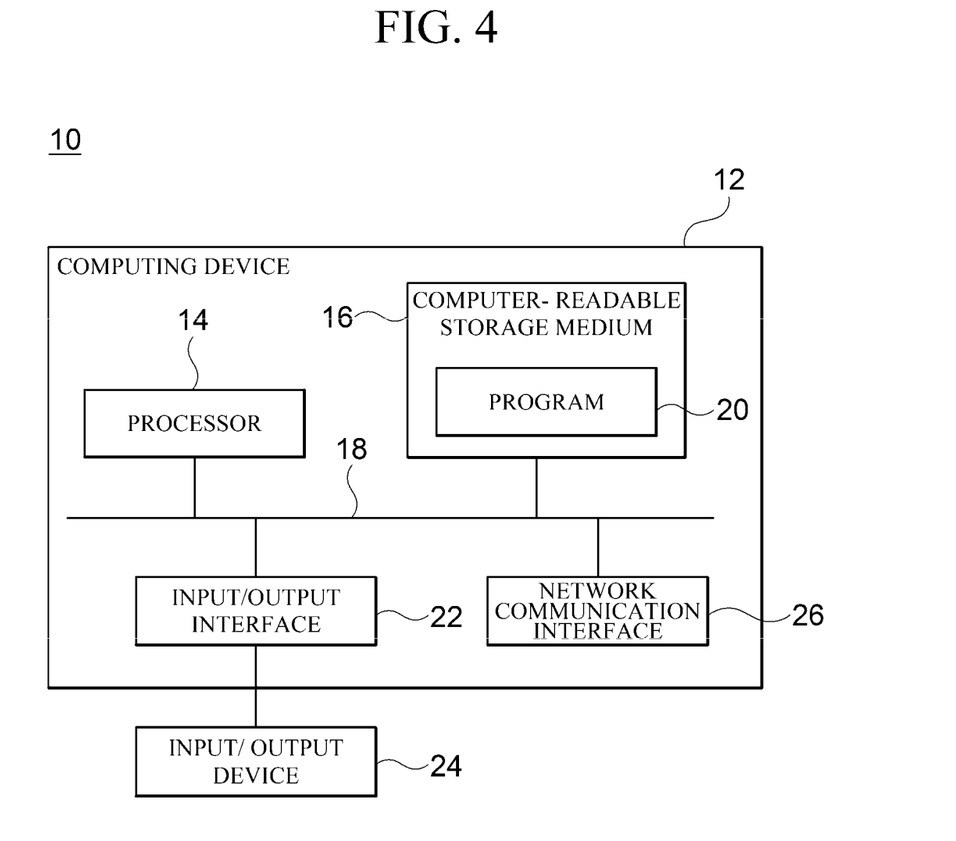
FIG. 4 is a block diagram for describing an example of a computing environment including a computing device suitable for use in exemplary embodiments.

FIG. 4 is a block diagram for describing an example of a computing environment 10 including a computing device suitable for use in exemplary embodiments. In the illustrated embodiment, each of the components may have functions and capabilities different from those described hereinafter and additional components may be included in addition to the components described herein.

The illustrated computing environment 10 includes a computing device 12. In an embodiment, the computing device 12 may be a security-related detection device 104. In addition, the computing device 12 may be a device for operating an enterprise business system.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In an embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device such as a mouse, a track pad, or the like, a keyboard, a touch input device such as a touch pad, a touch screen, or the like, an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to an embodiment, since a request for security detection is processed based on a queue in the security-related detection device, it is possible to ensure a precedence relationship for the request for security detection. Therefore, it is possible to secure consistency by ensuring the order when a request for large-scale security detection occurs. In addition, even when an error occurs in the process of security detection, a request for reprocessing may be available through an activated queue so that the omission rate can be reduced, thereby increasing reliability.

Moreover, the security-related detection device performs a security detection operation through a plurality of detectors, thereby enabling parallel processing for individual detection items, which can improve security detection processing speed, flexibly respond according to the change of detection policies, and allow resources in the security-related detection device 104 to be efficiently utilized.

Also, since the security-related detection device is implemented independently of the enterprise business system, the security-related detection device can perform security detection operations on various heterogeneous service systems (e.g., a file management service system, a messenger service system, an email system, and the like) in the enterprise, can be connected to other enterprise business systems, and is easy to expand.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computing device comprising:
   one or more processors to implement:
   a queue manager configured to receive a security detection request including a detection target file;
   a plurality of detectors configured to perform a security detection operation on the detection target file; and
   an operation distributor configured to acquire detection policy information related to the detection target file and distribute the detection target file received from the queue manager to one or more of the plurality of detectors based on the detection policy information,
   wherein the detection policy information includes one or more rules having one or more application areas for security detection of the detection target file; and
   the operation distributor is further configured to distribute, according to the one or more application areas of the one or more rules in the detection policy information, the detection target file to the one or more of the plurality of detectors so that the one or more of the plurality of detectors perform the security detection operation for the one or more application areas, respectively.

2. The computing device of claim 1, wherein the queue manager comprises:
   a waiting queue configured to sequentially store the received security detection request; and
   an input queue configured to sequentially receive the detection target file included in the security detection request from the waiting queue and to sequentially deliver the received detection target file to the operation distributor.

3. The computing device of claim 2, wherein the operation distributor is further configured to receive detection result information from the detectors to which the detection target file is distributed and the queue manager further comprises an output queue configured to receive the detection result information from the operation distributor and to sequentially output the detection result information.

4. The computing device of claim 1, wherein the plurality of detectors are provided to operate in parallel when performing the security detection operation, through the distribution of the operation distributor.

5. The computing device of claim 1, further comprising a detector manager configured to monitor resource status and operation status of the one or more detectors that perform the security detection operation according to the distribution of the operation distributor and to reduce or increase the number of corresponding detectors according to the monitoring result.

6. The computing device of claim 1, further comprising a detector manager configured to change a processor of one or more of the plurality of detectors, delete one or more detectors from the plurality of detectors, or add a new detector to the plurality of detectors according to a change in the detection policy information.

7. A system for data security comprising:
   a security-related detection device comprising the computing device of claim 1; and
   an enterprise business system comprising one or more second processors to implement:
   a file manager configured to transmit the security detection request including the detection target file to the security-related detection device and to receive detection result information from the security-related detection device;
   a detection policy manager configured to manage the detection policy information related to the detection target file; and
   a post-processor configured to perform post-processing on the detection target file according to the detection result information.

8. The system of claim 7, wherein the file manager is further configured to, when a result of checking the detection result information indicates that an error is included in the security detection operation, transmit a request for reprocessing a corresponding detection target file to the security-related detection device.

9. The system of claim 7, wherein the detection policy information includes one or more rules for security detection of the detection target file and the operation distributor is configured to distribute, according to an application area of a rule in the detection policy information, the detection target file to a detector that performs security detection according to a corresponding rule.

10. A method for data security, which is performed by a computing device comprising one or more processors and a non-transitory memory in which one or more programs to be executed by the one or more processors are stored, the method comprising:
　　receiving, at a queue manager, a security detection request including a detection target file;
　　acquiring, at an operation distributor, detection policy information related to the detection target file and distributing the detection target file received from the queue manager to one or more of the plurality of detectors based on the detection policy information; and
　　performing, at a plurality of detectors, a security detection operation on the detection target file,
　　wherein the detection policy information includes one or more rules having one or more application areas for security detection of the detection target file; and
　　the distributing comprises distributing, at the operation distributor, according to the one or more application areas of the one or more rules in the detection policy information, the detection target file to the one or more of the plurality of detectors so that the one or more of the plurality of detectors perform the security detection operation for the one or more application areas, respectively.

11. The method of claim 10, further comprising:
　　storing, at the queue manager, sequentially the received security detection request in a waiting queue;
　　inputting, at the queue manager, sequentially the detection target file included in the security detection request in the waiting queue into an input queue; and
　　delivering, at the queue manager, sequentially the detection target file in the input queue to the operation distributor.

12. The method of claim 11, further comprising:
　　receiving, at the operation distributor, detection result information from the detectors to which the detection target file is distributed; and
　　storing, at the queue manager, the detection result information received from the operation distributor in an output queue and outputting, at the output queue, sequentially the detection result information.

13. The method of claim 10, wherein in the performing of the security detection operation, the plurality of detectors operate in parallel when performing the security detection operation, through the distribution of the operation distributor.

14. The method of claim 10, further comprising:
　　monitoring, at a detector manager, resource status and operation status of the detector that performs the security detection operation according to the distribution of the operation distributor; and
　　reducing or increasing the number of corresponding detectors according to the monitoring result.

15. The method of claim 10, further comprising changing, at the detector manager, a processor of one or more of the plurality of detectors, deleting one or more detectors from the plurality of detectors, or adding a new detector to the plurality of detectors according to a change in the detection policy information.

16. A computing device comprising:
　　one or more processors;
　　a non-transitory memory; and
　　one or more programs stored in the memory and configured to be executed by the one or more processors, the one or more programs comprising instructions for:
　　　　receiving a security detection request including a detection target file,
　　　　acquiring detection policy information related to the detection target file,
　　　　distributing the received detection target file to one or more of a plurality of detectors based on the detection policy information, and
　　　　causing the plurality of detectors to perform a security detection operation on the detection target file,
　　wherein the detection policy information includes one or more rules having one or more application areas for security detection of the detection target file; and
　　the distributing comprises distributing, according to the one or more application areas of the one or more rules in the detection policy information, the detection target file to the one or more of the plurality of detectors so that the one or more of the plurality of detectors perform the security detection operation for the one or more application areas, respectively.

\* \* \* \* \*